United States Patent [19]

Harasaki

[11] Patent Number: 4,545,612
[45] Date of Patent: Oct. 8, 1985

[54] FRONT SIDE STRUCTURE OF AN AUTOMOBILE BODY

[75] Inventor: Hayathugu Harasaki, Hiroshima, Japan

[73] Assignee: Mazda Motor Corporation, Hiroshima

[21] Appl. No.: 411,007

[22] Filed: Aug. 24, 1982

[30] Foreign Application Priority Data

Aug. 26, 1981 [JP] Japan ............................ 56-134624
Sep. 28, 1981 [JP] Japan ............................ 56-153141

[51] Int. Cl.⁴ ............................................ B62D 27/00
[52] U.S. Cl. ..................................... 296/185; 296/192; 296/194
[58] Field of Search ............... 296/185, 187, 192–194, 296/198, 202–204, 205, 209, 197, 188, 189

[56] References Cited

U.S. PATENT DOCUMENTS

| 3,541,668 | 11/1970 | Wessells, III et al. | 296/193 X |
| 3,596,978 | 8/1971 | Wessells, III et al. | 296/194 |
| 3,697,124 | 10/1972 | Wessells | 296/185 |
| 3,776,589 | 12/1973 | Bareny et al. | 296/187 |
| 3,819,224 | 6/1974 | Casey et al. | 296/188 X |
| 4,078,840 | 3/1978 | Itoh | 296/192 |
| 4,252,364 | 2/1981 | Toyama et al. | 296/185 |
| 4,270,793 | 6/1981 | Harasaki et al. | 296/192 |
| 4,466,654 | 8/1984 | Abe | 296/192 |
| 4,469,368 | 9/1984 | Eger | 296/194 X |

FOREIGN PATENT DOCUMENTS

| 3119572 | 3/1982 | Fed. Rep. of Germany | 296/197 |
| 042761 | 11/1981 | Japan | 296/209 |
| 0136565 | 8/1983 | Japan | 296/188 |

Primary Examiner—Robert B. Reeves
Assistant Examiner—Russell D. Stormer
Attorney, Agent, or Firm—Fleit, Jacobson, Cohn & Price

[57] ABSTRACT

An automobile having a front pillar comprised of an upper front pillar section and a lower hinge pillar section. A forwardly extending beam of closed cross-section is formed by a dash panel, a cowl side upper panel and a wheel apron reinforcement. A second forwardly extending beam of closed cross-section is further provided beneath the first mentioned beam by the dash panel and forward extensions of an upper front pillar inner panel and a hinge pillar outer panel.

9 Claims, 12 Drawing Figures

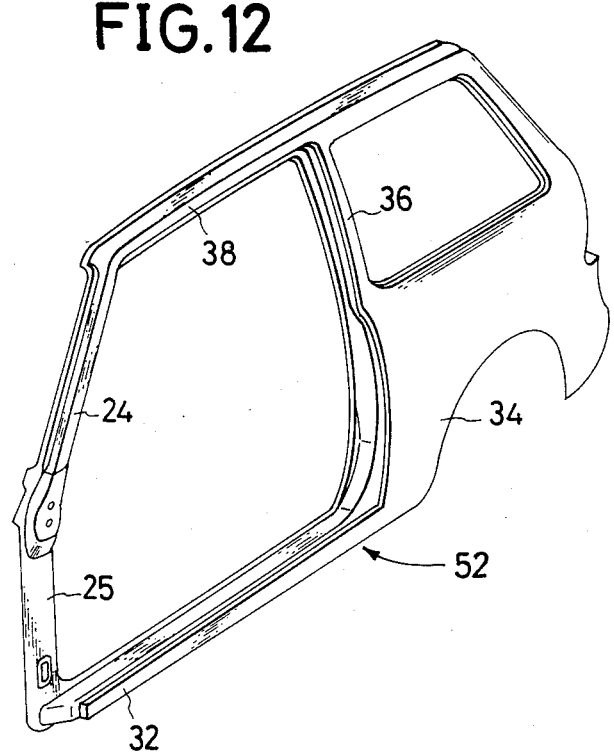

FRONT SIDE STRUCTURE OF AN AUTOMOBILE BODY

The present invention relates to a front body structure of an automobile and more particularly, to a front side structure of such automobile body.

Conventionally, a front side structure of an automobile body includes a front pillar comprised of a front pillar inner panel and a front pillar outer panel which are welded together to form a pillar structure of closed cross-section. A hinge pillar is formed to extend continuously with and downwardly from the front pillar. A longitudinal beam of closed cross-section is further formed to extend forwardly from the front pillar. Such longitudinal beam is usually constituted by a dash panel upper segment, a cowl side upper panel which is disposed above the side edge portion of the dash panel upper segment to be welded thereto, and a wheel apron reinforcement which is welded to the side edge portion of the dash panel upper segment and the cowl side upper panel to form a closed cross-section. Such conventional front side structure has been found disadvantageous in that the connection between the front pillar and the longitudinal beam does not have a sufficient strength so that there has been a problem of the front windshield glass from falling off in an accident. Further, the front pillar and the hinge pillar have not been satisfactory in respect of their strength and rigidity.

It is therefore an object of the present invention to provide a front side structure of an automobile body including a longitudinal beam of a closed cross-section which is rigidly secured to a front pillar of a closed cross-section.

Another object of the present invention is to provide a front side structure of an automobile body which includes a hinge pillar rigidly connected with a front pillar and a side sill.

A further object of the present invention is to provide a strong and rigid front side structure of an automobile body.

According to the present invention, the above and other objects can be accomplished by an automobile body including a front side structure comprised of a front pillar which is of a closed cross-section and disposed to define a front edge of a side door opening, a dash panel having a substantially horizontal portion extending forwardly from said front pillar, first means provided above said horizontal portion of the dash panel and connected thereto to form an upper longitudinal beam of a closed cross-section, said longitudinal beam being connected at rear end with said front pillar, second means provided below said horizontal portion of the dash panel and connected thereto to form a lower longitudinal beam of a closed cross-section which is connected at rear end with said front pillar. In a preferable aspect of the present invention, the second means may be constituted by forward extensions of members constituting the front pillar. The front pillar may comprise an upper front pillar section and a lower hinge pillar section, said upper front pillar section including an upper front pillar inner panel and an upper front pillar outer panel which are connected together to form said closed cross-section, said upper front pillar outer panel being stepped laterally inwardly at a lower end portion of the upper front pillar section and extended downwardly to provide a hinge pillar inner panel, a hinge pillar outer panel being connected to said hinge pillar inner panel to provide said lower hinge pillar section. The hinge pillar inner panel may further be stepped laterally outwardly at a lower end portion to provide an outer member of a side sill. The upper front pillar outer panel may be formed integrally with a cab side panel which provides a rear fender and an outer member of a roof rail. According to the features of the present invention, the connection between the upper longitudinal beam and the front pillar can be reinforced by the lower longitudinal beam so that a strong and rigid front side structure can be provided. Further, a rigid and strong connection can be provided between the front pillar and the side sill.

The above and other objects and features of the present invention will become apparent from the following descriptions of a preferred embodiment taking reference to the accompanying drawings, in which:

FIG. 12 is a perspective view of the cab side plate.

Figure 1:
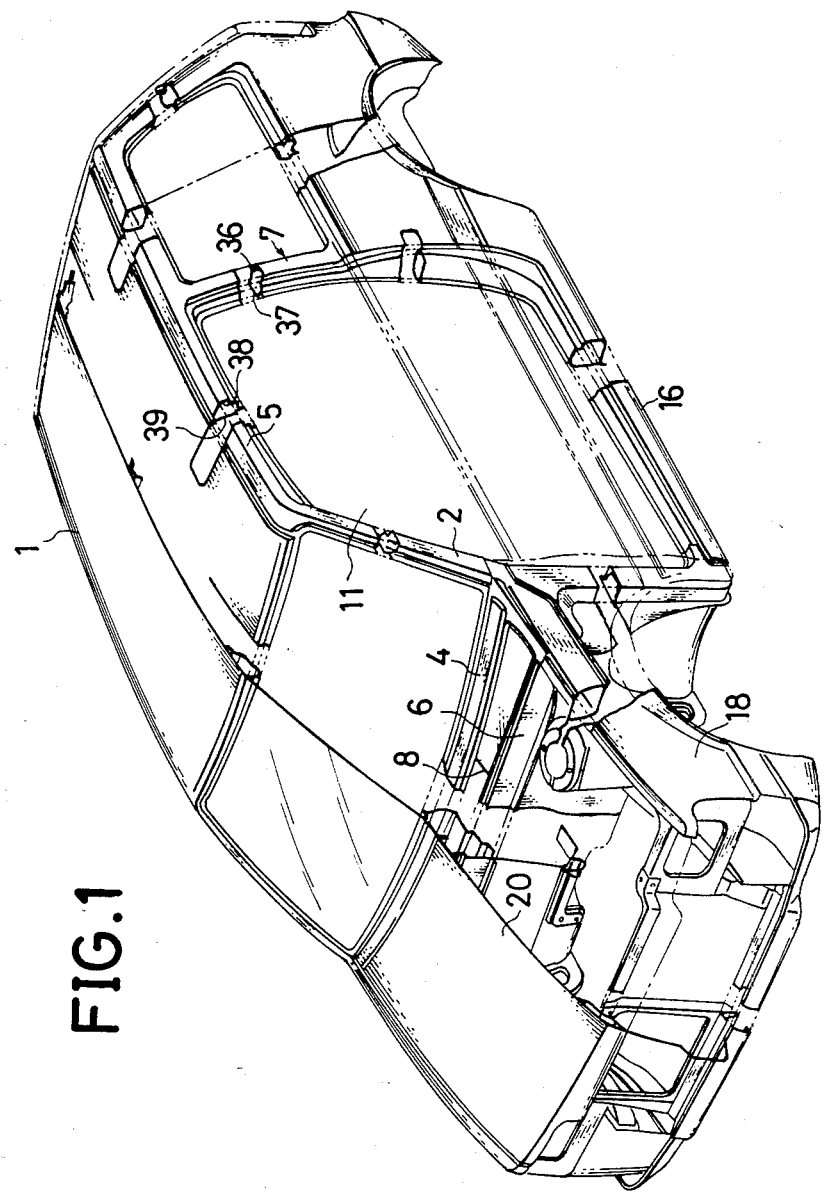
FIG. 1 is a perspective view of an automobile body embodying the features of the present invention.

Referring now to the drawings, particularly to FIG. 1, there is shown an automobile body including a roof panel 1 and a pair of roof rails 5 extending along opposite sides of the roof panel 1. A front pillar 2 is provided to extend substantially downwardly from the forward end of each roof rail 5. A center pillar 7 extends downwardly from an intermediate portion of the roof rail 5 and a side sill 16 is provided between the lower ends of the front pillar 2 and the center pillar 7 to form a side structure. A side door opening 11 is defined in the side structure by the roof rail 5, the front and center pillars 2 and 7 and the side sill 16. The body also has a front structure including a cowl upper panel 4 extending transversely between intermediate portions of the front pillars 2 and a cowl inner panel 6 located in front of and spaced apart from the cowl upper panel 4.

Figure 2:
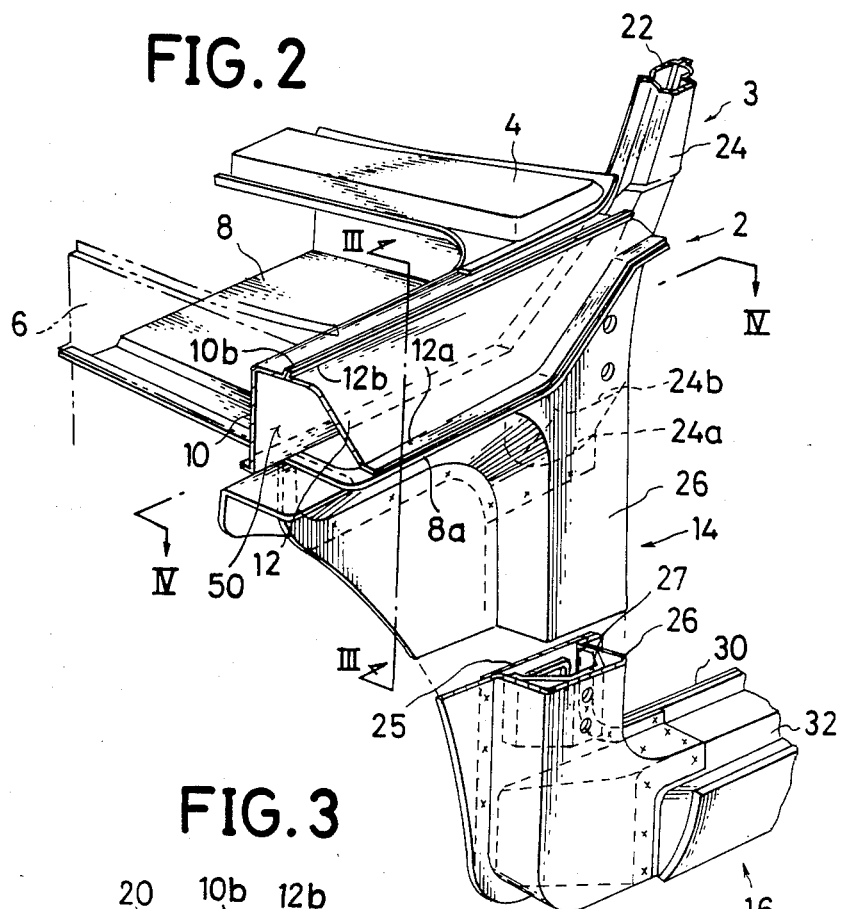
FIG. 2 is a fragmentary perspective view of a front side structure in accordance with one embodiment of the present invention.
Figure 4:
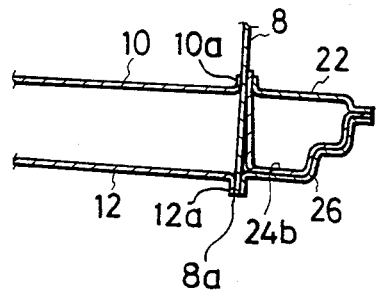
FIG. 4 is a sectional view taken substantially along the line IV—IV in FIG. 2.
Figure 7:
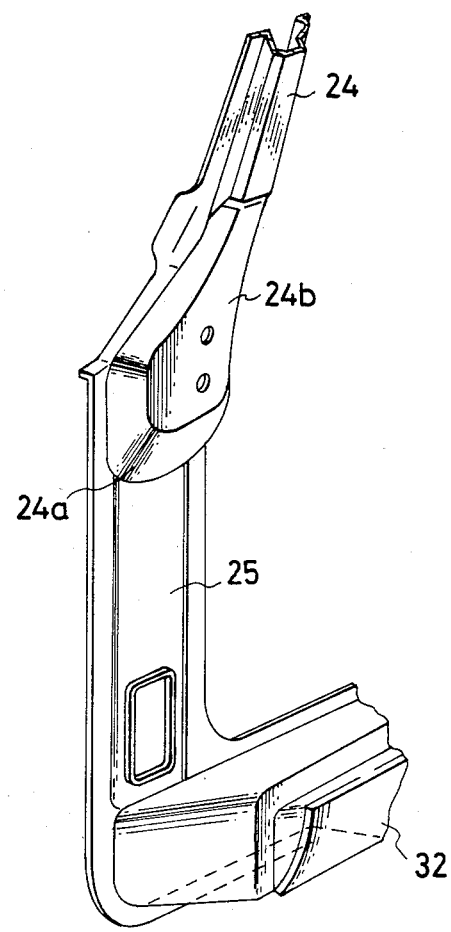
FIG. 7 is a fragmentary perspective view of a hinge pillar inner portion of a cab side plate.
Figure 8:
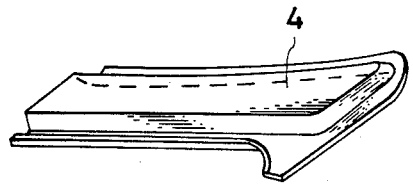
FIG. 8 is a fragmentary perspective view of a cowl upper panel.
Figure 9:
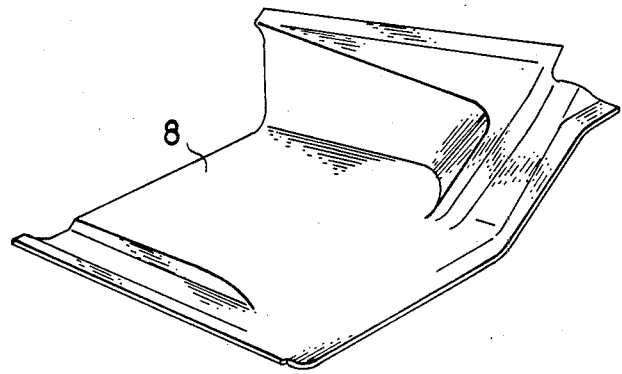
FIG. 9 is a fragmentary perspective view of a dash panel upper.

Referring to FIG. 2, it will be noted that the front pillar 2 is constituted by an upper front pillar section 3 and a lower hinge pillar section 14. The upper front pillar section 3 includes a front pillar inner panel 22 and a front pillar outer panel 24 which are welded together to form a pillar structure of closed cross-section. The hinge pillar section 14 includes a hinge pillar inner panel 25 and a hinge pillar outer panel 26 which are welded together to from a pillar structure of closed cross-section. As shown in FIGS. 7 and 12, the front pillar outer panel 24 and the hinge pillar inner panel 25 are integrally formed by providing an inwardly stepped portion 24a at the lower end portion of the front pillar outer panel 24. The front pillar outer panel 24 is formed at the lower end portion thereof with a slightly inwardly stepped land 24b which is overlapped by an upper end portion of the hinge pillar outer panel 26 as shown in FIGS. 2 and 4. Thus, it will be noted that the land 24b provides an upper door hinge reinforcement. In the hinge pillar section 14, there is provided a lower door hinge reinforcement 27 as shown in FIG. 2 to back-up the hinge pillar outer panel 26 for attachment of a door hinge.

Figure 3:
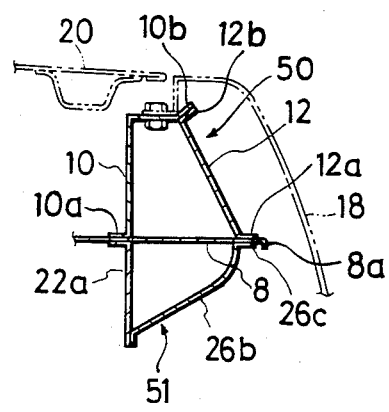
FIG. 3 is a sectional view taken substantially along the line III—III in FIG. 2.
Figure 10:
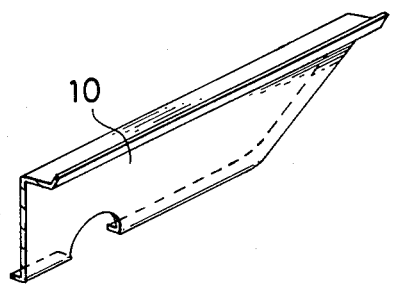
FIG. 10 is a fragmentary perspective view of a cowl side upper.
Figure 11:
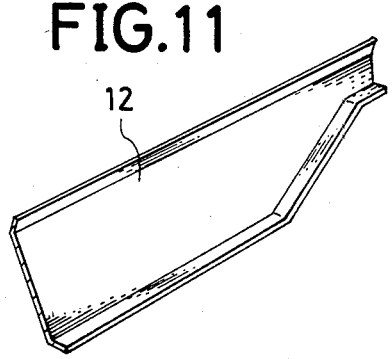
FIG. 11 is a fragmentary perspective view of a wheel apron reinforcement.

In FIGS. 2 and 3, it will be noted that an upper dash panel 8 extends rearwardly from the cowl inner panel 6 and bent upwardly at the rear end to be connected with the cowl upper panel 4. A cowl side upper panel 10 having a configuration as shown in FIG. 10 is provided above the dash panel upper panel 8 and extends longitudinally. At an area located transversely outside of the cowl side upper panel 10, there extends longitudinally a wheel apron reinforcement 12 which is of a configuration as shown in FIG. 11 and welded at the lower edge 12a to a transversely outer edge 8a of the upper dash panel 8. The cowl side upper panel 10 is welded at the lower edge 10a to the upper dash panel 8 and at the rear end to the front pillar outer panel 24. The cowl side upper panel 10 and the wheel apron reinforcement 12 are welded together along their upper edges 10b and 12b respectively to provide an upper longitudinally extending beam structure 50 of closed cross-section. A front fender 18 is provided so as to cover a side portion of the front structure and a bonnet 20 is provided to cover an upper portion.

Figure 5:
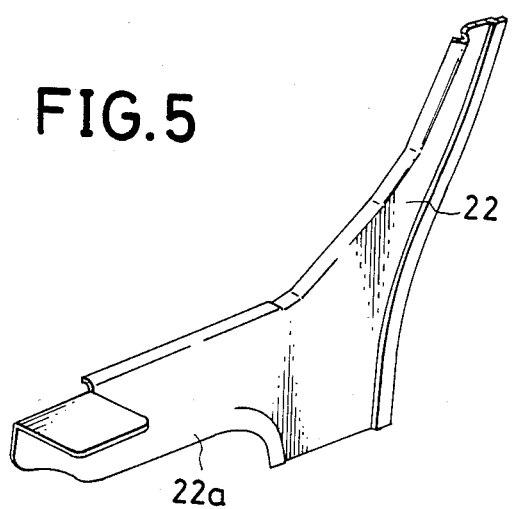
FIG. 5 is a perspective view of a pillar inner used in the embodiment shown in FIG. 2.
Figure 6:
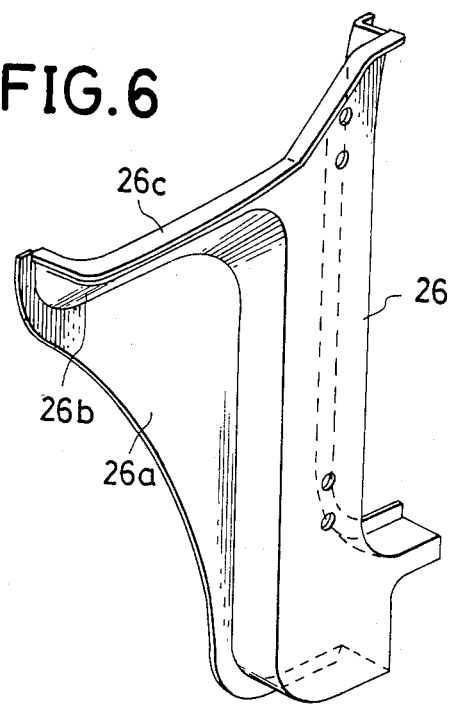
FIG. 6 is a perspective view of a hinge pillar outer used in the embodiment shown in FIG. 2.

Referring to FIG. 5, it will be noted that the front pillar inner panel 22 has a forward extension 22a which extends beneath the upper dash panel 8 in substantially vertical alignment with the cowl side upper panel 10 as shown in FIG. 3. The hinge pillar outer panel 26 is also formed with a forwardly enlarged portion 26a which is bulged outwardly at the upper edged portion to form a longitudinal reinforcement 26b. The hinge pillar outer panel 26 is formed along its upper edge with a flange 26c and the transverse outer edge of the upper dash panel 8 is formed so as to conform to the shape of the flange 26c. The flange 26c of the hinge pillar outer panel 26 is welded to the transverse outer edge of the upper dash panel 8 which is in turn welded to the lower and rear edges of the wheel apron reinforcement 12. The forwardly enlarged portion 26a of the hinge pillar outer panel 26 is welded to the extension 22a of the front pillar inner panel 22 at the border to the longitudinal reinforcement 26b so that a lower longitudinal beam structure 51 of closed cross-section is formed by the upper dash panel 8, the forward extension 22a of the front pillar inner panel 22 and the longitudinal reinforcement 26b of the hinge pillar outer panel 26. It should be noted that in the structure described above the connection between the upper longitudinal beam structure 50 and the front pillar 2 is reinforced by the lower longitudinal beam structure 51.

The side sill 16 is constituted by a side sill inner panel 30 and a side sill outer panel 32. In the illustrated embodiment, the side sill outer panel 32 is formed integrally with the hinge pillar inner panel 25 by providing a transversely outwardly bulged portion as shown in FIG. 7. The side sill inner panel 30 and the side sill outer panel 32 are welded together along their upper and lower edges to form a longitudinally extending beam structure of closed cross-section. The hinge pillar outer panel 26 is welded at the lower end portion to the side sill outer panel 32 as shown in FIG. 2. As shown in FIG. 12, the side sill outer panel 32 is integrally formed with a rear fender panel 34 which is also integral with a center pillar outer panel 36, and a roof rail outer panel 38 and the aforementioned front pillar inner panel 24 to form an integral cab side panel 52. As shown in FIG. 1, the center pillar outer panel 36 is welded to a center pillar inner panel 37 to form the aforementioned center pillar 7 of a closed cross-section. The roof rail outer panel 38 is welded to a roof rail inner panel 39 to form the aforementioned roof rail 5 of a closed cross-section.

The invention has thus been shown and described with reference to a specific embodiment, however, it should be noted that the invention is in no way limited to the details of the illustrated structures but changes and modifications may be made without departing from the scope of the appended claims.

I claim:

1. An automobile body comprising a front side structure comprised of a front pillar having a closed cross-section, a front edge of a side door opening being defined by said front pillar, a dash panel having a substantially horizontal portion extending forwardly from said front pillar, first means provided above said horizontal portion of the dash panel and connected thereto, an upper longitudinal beam having a closed cross-section being formed by said first means and said horizontal portion of the dash panel, said upper longitudinal beam being connected at its rear end with said front pillar, second means provided below said horizontal portion of the dash panel and connected thereto, and a lower longitudinal beam having a closed cross-section being formed by said second means and said horizontal portion of the dash panel, said lower longitudinal beam being connected at its rear end with said front pillar.

2. An automobile body in accordance with claim 1 in which said first means is constituted by a wheel apron reinforcement extending along a side edge of the dash panel and connected thereto at a lower edge portion, and a cowl side upper panel having a lower edge portion transversely inwardly spaced from said lower edge portion of the wheel apron reinforcement and connected to the dash panel, said wheel apron reinforcement and said cowl side upper panel having upper edge portions connected together.

3. An automobile body in accordance with claim 1 in which said second means is constituted by forward extensions of members constituting the front pillar.

4. An automobile body in accordance with claim 1 in which said front pillar comprises an upper front pillar section and a lower hinge pillar section, said upper front pillar section comprising a front pillar inner panel and a front pillar outer panel which are connected together, said lower hinge pillar section comprising a hinge pillar inner panel and a hinge pillar outer panel which are connected together, said front pillar inner panel and said hinge pillar outer panel having forward extensions which constitute said second means.

5. An automobile body in accordance with claim 1 in which said front pillar comprises an upper front pillar section and a lower hinge pillar section, said upper front pillar section including an upper front pillar inner panel and an upper front pillar outer panel which are connected together to form said closed cross-section of said front pillar, said upper front pillar outer panel being stepped laterally inwardly at a lower end portion of the upper front pillar section and extended downwardly to provide a hinge pillar inner panel, a hinge pillar outer panel being connected to said hinge pillar inner panel to provide said lower hinge pillar section.

6. An automobile body in accordance with claim 5 in which said front pillar inner panel and said hinge pillar outer panel having forward extensions which constitute said second means.

7. An automobile body in accordance with claim 5 in which said hinge pillar inner panel is further stepped laterally outwardly at a lower end portion to provide an outer member of a side sill.

8. An automobile body in accordance with claim 5 in which said upper front pillar outer panel and said hinge pillar inner panel are formed integrally with a cab side panel which provides an outer member of a side sill, a rear fender and an outer member of a roof rail.

9. An automobile in accordance with claim 5 in which said upper front pillar outer panel is formed at a lower end portion with a land which is overlapped by an upper end portion of the hinge pillar outer panel so that said land acts as a hinge reinforcement.

* * * * *